United States Patent [19]

Schulte et al.

[11] Patent Number: 4,599,262

[45] Date of Patent: Jul. 8, 1986

[54] ELECTRICALLY CONDUCTIVE POLYCARBONATE LAMINATES AND THEIR PREPARATION

[75] Inventors: Bernhard Schulte, Krefeld; Werner Tischer; Hans Kaloff, both of Dormagen; Hans-Leo Weber, Rommerskirchen, all of Fed. Rep. of Germany

[73] Assignee: Bayer Aktiengesellschaft, Leverkusen, Fed. Rep. of Germany

[21] Appl. No.: 668,911

[22] Filed: Nov. 6, 1984

[30] Foreign Application Priority Data

Nov. 11, 1983 [DE] Fed. Rep. of Germany ....... 3340930

[51] Int. Cl.⁴ .................... B32B 7/02; B32B 27/36; C25D 9/02; H01B 1/06
[52] U.S. Cl. ................... 428/215; 428/408; 428/412; 428/480; 428/521; 428/109; 156/150; 156/163; 264/176 K; 264/212
[58] Field of Search ............... 428/215, 408, 480, 412, 428/521; 156/150, 163

[56] References Cited

U.S. PATENT DOCUMENTS

| | | | |
|---|---|---|---|
| 3,416,992 | 12/1968 | Amos | 156/150 X |
| 3,654,187 | 4/1972 | Takenaka et al. | 252/511 |
| 4,265,789 | 5/1981 | Christopherson | 428/408 X |

FOREIGN PATENT DOCUMENTS

| | | |
|---|---|---|
| 720314 | 2/1969 | Belgium . |
| 1155289 | 10/1983 | Canada . |
| 2542650 | 3/1977 | Fed. Rep. of Germany . |
| 2148143 | 3/1973 | France . |
| 2003088 | 3/1979 | United Kingdom . |

OTHER PUBLICATIONS

Patents Abstracts of Japan, Sep. 27, 1978, vol. 2, No. 116.

*Primary Examiner*—P. C. Ives
*Attorney, Agent, or Firm*—Gene Harsh; Joseph C. Gil; Aron Preis

[57] ABSTRACT

The present invention relates to polycarbonate laminates consisting of an electrically conductive polycarbonate layer (A) containing carbon black or graphite, and an electrically insulating polycarbonate layer (B), their preparation and their use in the electrical sector.

18 Claims, No Drawings

ELECTRICALLY CONDUCTIVE POLYCARBONATE LAMINATES AND THEIR PREPARATION

The present invention relates to polycarbonate laminates, preferably films or sheets, consisting of (A) an aromatic, thermoplastic polycarbonate layer containing 5 to 45% by weight, preferably 10 to 40% by weight and in particular 20 to 35% by weight, based on the weight of the polycarbonate layer (A), of carbon black or graphite, in particular carbon black, with an $\overline{M}w$ (weight-average molecular weight; gel permeation chromatography determination) of the polycarbonate used of between 20,000 and 300,000, preferably between 40,000 and 250,000 and in particular between 60,000 and 200,000, a surface resistivity of 1 to $10^9\Omega$, preferably 5 to $10^6\Omega$ and in particular 10 to $10^3\Omega$, and a thickness of 0.002 to 0.4 mm, and (B) a layer, firmly laminated with this layer, of an aromatic, thermoplastic polycarbonate with an $\overline{M}w$ (weight-average molecular weight) of 10,000 to 60,000 and a thickness of 0.02 to 5 mm, preferably 0.05 to 2 mm.

Polycarbonate films containing carbon are known (see, for example, Belgian Patent Specification No. 720,314, U.S. Pat. No. 3,654,187, U.S. Pat. No. 3,697,450 and EP-OS European Published Specification No. 0,032,379). Such polycarbonate films, which, however, are filled with very small amounts of carbon black of 2 to 3% by weight, are described, for example, as laminates with layers of other plastics for industrial use as an electrostatic recording material (see Japanese Pat. No. 159,149 of 28.12.1976, published on 20.07.1978). Laminates of other plastics materials and containing carbon black can be used, for example, for antistatic purposes (see Rumanian Patent Application No. 219,465 of 22.07.1965, published October 1968), as hot-plates (see Japanese Pat. No. 107,242 of 09.09.1976 published 29.03.1978) or as heating elements (see U.S. Pat. No. 3,900,654 and Belgian Patent Specification No. 770,821).

However, all these possibilities have the disadvantage either that relatively small amounts of carbon black are incorporated into one polycarbonate layer of the laminate, or that the highly filled electrically conductive layer of other thermoplastics with, for example, carbon black contents of up to 50% by weight is supported between two insulating layers.

The present invention is based on the knowledge that electrically conductive polycarbonate laminates (for example in the form of films or sheets) of two layers firmly laminated to one another have a very high mechanical strength and in addition are also highly thermoformable, for example during deep-drawing, even when these laminates have very low surface resistivities of below 1,000$\Omega$ (measured according to DIN 53 482), if the combination according to the invention of layers (A) and (B) is used.

The aromatic, thermoplastic polycarbonates which are suitable for the polycarbonate layer (A) containing carbon black or graphite are the polycondensates obtainable by reacting diphenols, in particular, dihydroxydiarylalkanes, with phosgene or diesters of carbonic acid, dihydroxydiarylalkanes in which the aryl radicals carry methyl groups or halogen atoms in the o- and/or m-position relative to the hydroxyl group also being suitable, in addition to the unsubstituted dihydroxydiarylalkanes.

Examples of suitable diphenols are hydroquinone, resorcinol, 4,4'-dihydroxydiphenyl, bis-(hydroxy-phenyl)alkanes, such as, for example, $C_1-C_8$-alkylene- or $C_2-C_8$-alkylidene-bisphenols, bis-(hydroxy-phenyl)-cycloalkanes, such as, for example, $C_5-C_{15}$-cycloalkylene- or $C_5-C_{15}$-cycloalkylidene-bisphenols, and bis-(hydroxy-phenyl) sulphides, ethers, ketones, sulphoxides or sulphones and furthermore $\alpha,\alpha'$-bis-(hydroxyphenyl)-diisopropylbenzene and the corresponding nuclear-alkylated or nuclear-halogenated compounds. Preferred polycarbonates are those based on 2,2-bis-(4-hydroxy-phenyl)-propane (bisphenol A), 2,2-bis-(4-hydroxy-3,5-dichloro-phenyl)-propane (tetrachlorobisphenol A), 2,2-bis-(4-hydroxy-3,3-dibromophenyl)-propane (tetrabromobisphenol A), 2,2-bis-(4-hydroxy-3,5-dimethyl-phenyl)-propane (tetramethylbisphenol A), 1,1-bis-(4-hydroxy-phenyl)-cyclohexane (bisphenol Z) or on trinuclear bisphenols, such as $\alpha,\alpha'$-bis-(4-hydroxyphenyl)-p-diisopropylbenzene. Other diphenols which are suitable for the preparation of the polycarbonates are described, for example, in U.S. Pat. Nos. 3,028,365, 3,062,781 and 3,275,601.

Besides linear polycarbonates, branched polycarbonates are also suitable; as is known, such branched polycarbonates can be prepared by incorporating small amounts, preferably amounts of between 0.05 and 2.0 mol%, based on the diphenols employed, of tri- or more than trifunctional compounds, for example those with three or more than three phenolic hydroxyl groups (in this context, see, for example, DE-OS (German Published Specification) No. 1,570,533, DE-OS (German Published Specification) No. 1,595,762 and DE-OS (German Published Specification) No. 2,500,092). Examples of some of these compounds with three or more than three phenolic hydroxyl groups which can be used are 1,3,5-tri-(4-hydroxyphenyl)-benzene, 1,1,1-tri-(4-hydroxyphenyl)-ethane, 2,4-bis-(4-hydroxyphenyl-isopropyl)-phenol, 2-(4-hydroxyphenyl)-2-(2,4-dihydroxyphenyl)-propane, hexa-(4-(4-hydroxyphenylisopropyl))-phenyl)-ortho-terephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxy-3-methyl-phenyl)-2-oxo-2,3-dihydroindole.

Preferred polycarbonates are those of bisphenol A containing 0 to 5 mol%, based on the number of mols of diphenols, of cocondensed bisphenol Z.

The polycarbonates which are suitable according to the invention should have relative viscosities $\eta$rel of 1.2 to 3.0, preferably 1.5 to 2.5 and in particular 1.6 to 2.4. (The relative viscosities are measured in a known manner on 0.5 g/100 ml of $CH_2Cl_2$ solutions at 25° C.). $\overline{M}w$ values of between about 20,000 and about 300,000, preferably between about 40,000 and 250,000 and in particular between 60,000 and 200,000, result from these viscosities. (Gel permeation chromatography molecular weight determinations).

The polycarbonates which are suitable according to the invention are prepared by known processes. The molecular weight is adjusted in a known manner with chain stoppers, such as phenol, halogenophenols or alkylphenols in the known amounts.

The aromatic, thermoplastic polycarbonates which are suitable for layer (B) correspond to those defined above, with the proviso that their $\overline{M}w$ (weight-average molecular weight from gel permeation chromatography molecular weight determination) is 10,000 to 60,000, preferably 20,000 to 40,000, corresponding to ηrel values in $CH_2Cl_2$ at 25° C. and 0.5 g per 100 ml of between 1.1 and 1.6, preferably between 1.2 and 1.5.

Up to 45% by weight, based on the total weight of layer (B), of thermoplastic polyethylene terephthalates, thermoplastic polybutylene terephthalates and/or ABS thermoplastics can be added to the thermoplastic, aromatic polycarbonates of layer (B) in a known manner. Non-conductive additives and/or non-conductive fillers, such as, for example, flameproofing agents, heat stabilisers, UV light stabilisers, mould release agents, dyestuffs, glass fibres, glass beads and the like can be added to the thermoplastic aromatic polycarbonates of layer (B) in the known amounts.

Carbon blacks which are suitable for the preparation of the polycarbonate layer (A) are gas blacks, furnace blacks or flame blacks with average primary particle sizes, which are in general determined by electron microscopy, of less than 200 nanometers (nm), preferably less than 100 nanometers (nm), and in particular with an average primary particle size of less than 50 nanometers; graphites which are suitable, according to the invention, for polycarbonate layer (A) are graphite powders or graphite dusts, which are available, for example, as electrode graphite in a wide grain spectrum with particle diameters of up to 5 mm, the graphite powders used preferably having average particle sizes of up to 1 mm, in particular up to 0.5 mm, the graphite particles being further comminuted and very finely dispersed in the polycarbonate solution in the manner described below.

Known, so-called conductivity carbon blacks are preferably used, which, in addition to a very low primary particle size, have a high outer and inner surface area, that is to say a high porosity and thus high BET surface areas on $N_2$ adsorption and high dibutyl phthalate (DBP) adsorption values, and moreover are highly structured, that is to say exhibit marked agglomeration or aggregation of individual carbon black particles into larger structures, such as, for example, chains, the BET surface areas of the carbon blacks in general being greater than 20 $mg^2/g$ and the DBP adsorptions being above 40 ml per 100 g of carbon black.

Conductivity carbon blacks with BET surface areas of more than 50 $m^2/g$ and DBP adsorptions of more than 60 ml/100 g with average primary particle sizes of below 50 nanometers (nm) are particularly suitable. Such electrically conductive carbon blakcs are commercially available as special carbon blacks with pronounced structures and high electrical conductivities.

The carbon black or graphite is incorporated into the thermoplastic polycarbonates via solutions of the polycarbonates, either into the reaction solutions directly after the process for the preparation of the polycarbonate or into separately prepared polycarbonate solutions after the polycarbonate has been isolated, it being possible for the electrically conductive additives either to be first suspended or precomminuted by themselves in suitable media before the polycarbonates are dissolved, or to be incorporated and very finely dispersed in the presence of the dissolved polycarbonate. Both possibilities can also be combined, in which case stepwise very fine dispersion is advantageously achieved using known dispersing devices, such as, for example, rotor-stator apparatuses, dissolver discs, high pressure homogenisers, ultra-sound sonors or bead mills with, for example, steel balls 0.5 to 3 mm in diameter.

Suitable media for the preparation of the dispersions are chlorinated hydrocarbons, such as, for example, methylene chloride, ethylene chloride, chloroform or chlorobenzene, it also being possible, however, additionally to use additives of, for example, methanol, ethanol, acetone, toluene, xylene, ethylene glycol and its mono- or di-ethers, propylene glycol and its ethers, glycerol, lauryl alcohol and its ethers and esters or phthalic acid esters, those additives, such as, for example, toluene or ethers of propylene glycol or ethylene glycol, which serve to increase the crystallinity of the polycarbonate during the production of cast films being preferred.

The dispersions which can thus be prepared in the abovementioned organic media and which in general have solid contents of polycarbonate and carbon black or polycarbonate and graphite of 4 to 25% by weight, preferably 60 to 18% by weight, are in most cases also subjected to fine filtration through average mesh widths of below 100 μm, preferably of below 50 μm, in order to remove particle agglomerates.

If carbon black is used, the dispersions thus filtered in general still only have particles sizes of less than 10 μm (measurement by means of an ultracentrifuge or laser diffraction), preferably of less than 5 μm and, in the ideal case, of less than 2 μm.

The polycarbonate layers containing carbon black or graphite are preferably 0.006 mm to 0.3 mm and in particular 0.01 to 0.2 mm thick and are cast films which are either non-stretched or stretched monoaxially or biaxially by preferably 5% to 250%, in particular by 10% to 200%, by known processes.

The cast polycarbonate films can be produced from the dispersions described above on belt or drum casting machines with known casters, such as doctor casters or die casters, the polycarbonate films produced having a solvent content of 0.2 to 12% by weight (VDE 0345), preferably 0.5 to 8% by weight, and in particular solvent contains of 0.6 to 5% by weight, before the coating process.

If stretched cast polycarbonate films containing carbon black or graphite are used as layer (A) for coating with the polycarbonate layer (B), stretching of the cast polycarbonate films described above is effected monoaxially or biaxially on industrial stretching devices, the solvent content being adjusted before the stretching process by separate drying, preferably to 0.5 to 8% by weight, and monoaxial stretching in the longitudinal direction, that is to say the direction of casting of the cast film, being preferred. Known industrial stretching machines equipped with rolls which can be heated, for example machines from Hofmann und Schwabe or Kampf, are suitable for this, stretching being carried out by single-nip stretching, that is to say between a heated roll (1) with an intake speed $V_1$ and a heated roll (2) with the maximum temperature, the so-called stretching temperature, which is in general achieved by oil heating, and a delivery speed $V_2$, in a gap about 3 to 10 mm wide, the stretching ratio $V_1:V_2$ varying from 1:1.05 to 1:3.5, preferably from 1:1.1 to 1:3.0 and in particular from 1:1.2 to 1:2.5.

In general, a third roll with a lower temperature than the stretching temperature is included downstream for thermofixing.

The stretching process can also be carried out by multi-stretching, in which case stretching machines with several driven rolls of different speed and temperature are used and non-driven heated rolls are included within the stretching zones in order to even out the stretching process. The diameter of the rolls can be varied from, for example, 40 to 300 mm, and, in general, the surface of the stretching rolls is roughened by blasting or rolls coated with plastic or ceramic are used for better adhesion. The temperature of the stretching roll heated to the highest temperature is designated the so-called stretching temperature $T_R$, which varies in the range from 170° to 250° C., preferably 180° to 230° C.

Layer (B) is an extruded polycarbonate layer which is produced in a known manner, for example by extrusion from a sheet die at temperatures between 200° C. and 350° C., preferably between 250° C. and 320° C.

The two polycarbonate layers (A) and (B) are preferably joined by a process in which the polycarbonate layer obtained immediately after the extrusion is pressed together either with the cast polycarbonate film according to layer (A) or with the stretched cast polycarbonate film according to layer (A) between two rolls under pressures of 5 to 100 bar and at temperatures of the melt issuing from the sheet die of 200° to 320° C.

The present invention thus also relates to a process for the production of the polycarbonate laminates according to the invention, consisting of layers (A) and (B) defined above, which is characterised in that an extruded polycarbonate film which is produced by extrusion in the known manner and can also contain up to 45% by weight, based on the total weight of layer (b), of thermoplastic polyethylene terephthalates, thermoplastic polybutylene terephthalates and/or ABS plastics, and is 0.02 to 5 mm thick, is pressed together with a cast polycarbonate film, which can optionally be stretched and which contains 5 to 45% by weight, based on the weight of the cast polycarbonate film, of carbon black or graphite and has a thickness of 0.002 to 0.4 mm, between two rolls under pressures of 5 to 100 bar and at melt temperatures of 200° to 320° C., one of the rolls, in particular the pressure roll, preferably being a roll coated with plastic or rubber.

The resulting laminates according to the invention have a good mechanical strength and dimensional stability on prolonged exposure to temperatures of up to 140° C.

Surprisingly, the surface resistivity of the preproduced electrically conductive polycarbonate film does not change when it comes into contact with a polycarbonate melt at temperatures of above 200° C. It is therefore possible to transfer the good conductivity and mechanical strength of the filler-containing cast polycarbonate films, and especially of the stretched polycarbonate films, to the extruded polycarbonate. The laminates according to the invention have a constant surface resistivity over large areas, that is to say very low standard deviations, which is necessary for many applications in electronics; they also have an excellently smooth surface and, in the case of the use of stretched electrically conductive polycarbonate films, have particularly good long-term properties in respect of electrical resistance values.

It is also surprising that the shaping properties, for example during deep-drawing, of the laminated polycarbonate films according to the invention are superior to those of mono-layered extruded polycarbonate films which are filled with carbon black and are of the same thickness, this manifesting itself in the fact that a considerably smaller change in the surface resistivity of the deep-drawn areas is measured on the laminated films according to the invention than on the extruded polycarbonate films which have been correspondingly deep-drawn and have the same thickness and same carbon black content.

Another advantage of the laminated films according to the invention is that very thin, non-stretched or stretched cast polycarbonate films containing carbon black or graphite, for example with a thickness of less than 0.05 mm, are stabilised for better handling as a result of the laminate formation according to the invention, that is to say, for example, allow better shaping by means of heat. This improvement was not to be expected, since non-stretched and, in particular, stretched polycarbonate films which are filled with carbon black and have a thickness in the range below 0.05 mm can be deep-drawn only to a very limited degree at carbon black contents of more than 15% by weight.

Suitable non-conductive additives and fillers in the insulating layer (B) are, in addition to the dyestuffs already mentioned, halogenated phthalimides, as flame-proofing agents, such as hexamethylene-bis-tetrachlorophthalimide, plasticisers, pigments, such as $TiO_2$, $BaSO_4$ or $BaCO_3$, or talc, as a filler.

The polycarbonate laminates according to the invention consisting of an electrically conductive layer (A) and an electrically insulating layer (B) can be used in all instances where the low surface resistivities of layer (A) are to be utilised for transportation of electric charges or for conversion of electrical energy into heat energy, or for shielding of electromagnetic radiation over large areas, which can then advantageously be adapted to the components to be protected by thermoforming of the laminate.

The polycarbonate laminates according to the invention are suitable, for example, for the production of heat-stable resistant films, potentiometers, flat heating elements or high-voltage dielectric coatings. They can also be used if electrostatic charging must be avoided or electromagnetic radiation must be shielded, for example for protecting MOS transistors or other components in digital electronics. They can also be used for heat absorption, for example of sunlight. In general, they can be employed when stability on prolonged exposure to temperatures of 130° to 140° C., is required, during transportation of electrical current. Electrical contacts can be produced in the conductive layer during the coating operation or subsequently, for example under the action of heat and under pressure. Metal coatings can also subsequently be applied to the electrically conductive polycarbonate layer. The polycarbonate laminates according to the invention can advantageously be used as covering plates with an antistatic finish for equipment, if the insulating layer has to have a scratch-resistant finish. They are also suitable for film or membrane switches.

Protective caps or housings, for example, which protect MOS transistors or bipolar semiconductors from electrostatic charging or electromagnetic radiation can be produced by deep-drawing the laminates according to the invention at about 180° to 280° C.

Those laminates according to the invention which have a thickness ratio of about 20:1 to 5:1, preferably 12:1 to 8:1, of the insulating layer (B) to the electrically conductive layer (A), with a total thickness of the laminate of up to 2 mm, preferably up to about 1 mm, are particularly suitable for shaping by deep-drawing.

The present invention thus also relates to the use of the polycarbonate laminates according to the invention in the electrical sector.

The surface resistances given in the following embodiment examples were measured with an FPP 5000 measuring instrument from VEECO (four-point measurement) at room temperature (20°–25° C.) and the dimensions are Ω per square, that is to say Ω/sq. These values scarcely differ from the surface resistivities (measured in Ω) obtained according to DIN 53 482.

EMBODIMENT EXAMPLES

Example 1

In methylene chloride as the solvent and dispersing agent, a bisphenol A polycarbonate containing 0.5 mol% of cyclohexylbisphenol (bisphenol Z) and having a relative viscosity $\eta$rel of 2.18 at 25° and molecular weights, determined by gel chromatography, $\overline{M}w$ of 168,000 is dissolved and a conductivity carbon black with an average primary particle size of 30 nanometers (nm), a BET surface area of 254 $m^2/g$ and a DBP adsorption of 178 ml/100 g are very finely dispersed, by means of a rotor-stator apparatus and a bead mill with steel balls 2 mm in diameter. The carbon black content is 15% by weight of the total solids content of carbon black/polycarbonate. This fine-particled dispersion is filtered over a filter of average mesh width 50 μm and then cast, with a viscosity of 9,200 mPas at 25° C., to an electrically conductive PC film about 30 μm thick on a drum-casting machine.

This cast film which is filled with carbon black and has a residual solvent content of 1.6% (according to VDE 0345), directly on extrusion of bisphenol A polycarbonate granules with a relative solution viscosity $\eta$rel of 1.33 and a melt flow index of 19.0 g/10 minutes at 300° C. (according to DIN 53 735) is fed in, together with the melt issuing from a sheet die, which has a temperature of about 260°–290° C., between a chromed steel roll with a temperature of about 85° C. and a rubber roll with a surface temperature of about 65° C. under an initial pressure of 30 bar, and is processed to a laminated PC film with a firmly adhering electrically conductive layer. The polycarbonate layer (B) is on average 320 μm thick, and the overall thickness is about 350–360 μm. The surface resistance is measured as 1,620Ω/sq using an FPP 5000 instrument from VEECO.

The insulating layer side of this laminated film is exposed to heat at a distance of about 25 cm for 12–15 seconds, a temperature on the surface of 240°–260° C. being measured with the aid of temperature measurement strips. After deep-drawing in the direction of the heated surface of the insulating layer using a parallelepipedal shaped metal article (length 34.5 nm, width 32.4 mm, height 17 mm), a stable protective cap is obtained which has the following surface resistances on the inner surfaces. Results of a four-point measurement with an FPP 5,000 instrument from VEECO at 20°–25° C. in dimensions of Ω/sq:

| | |
|---|---|
| Zone 1 | 1,620 Ω/sq |
| (Starting laminate 350–360 μm) | |
| Zone 2 | 2,310 Ω/sq |
| (Heated zone with a diameter of 105 mm) | |
| Zone 3 | 2,760 Ω/sq |
| (Side surfaces) | |
| Zone 4 | 1.715 Ω/sq |
| (Top surface) | |

Comparison Example A

The conductivity carbon black of Example 1 is incorporated in an amount of 15% by weight in a polycarbonate based on bisphenol A, with a melt flow index of 19.0 g/10 minutes at 300° C. according to DIN 53 735, which corresponds to a relative solution viscosity $\eta$rel of 1.33, on a twin-screw extruder at melt temperatures in the extruder of 300° to 320° C., and on discharge from a sheet die, an extruded polycarbonate film about 350 μm thick and with a surface resistance of 32,300Ω/sq is produced by means of a roll mill.

After carrying out a deep-drawing experiment under the conditions described under Example 1, the following surface resistances are found for the shaped zones:

| | |
|---|---|
| Zone 1 | 32,300 Ω/sq |
| (Mono-layered extruded film, thickness about 350 μm) | |
| Zone 2 | 166,900 Ω/sq |
| (Heated zone with a diameter of 105 mm) | |
| Zone 3 | 40,500 Ω/sq |
| (Side surfaces) | |
| Zone 4 | 17,230 Ω/sq |
| (Top surface) | |

The surface resistances of the mono-layered extruded film filled with carbon black and also of the corresponding deep-drawn surfaces of the extruded PC film provided with the same amount of carbon black filling (15% by weight) are more than ten times higher than those of the laminated PC film according to the invention described in Example 1.

Example 2

A cast polycarbonate film containing 30% by weight (based on the total solids) of a conductivity carbon black with a BET surface area of 1,000 $m^2/g$ and a DBP absorption of 400 ml/100 g, is produced in a thickness of 35 μm using the copolycarbonate of Example 1 under the conditions described in Example 1. The surface resistance is 55Ω/sq at a residual methylene chloride content of 1.4% (according to VDE 0345).

This cast PC film filled with carbon black is covered, without separate after-drying, with a 400 μm thick insulating layer between two rolls in the manner described in Example 1, using an extruded melt from the bisphenol A polycarbonate described in Example 1. The firmly adhering electrically conductive layer then has an unchanged surface resistance about 55Ω/sq.

The cap produced with a deep-drawing article (same geometry as described in Example 1)—under an exposure time of 18–20 seconds and under the deep-drawing conditions described in Example 1—has the following surface resistivities of the individual zones:

| | |
|---|---|
| Zone 1 | 55.8 Ω/sq |
| (Starting laminate, thickness about 440 μm) | |
| Zone 2 | 58.0 Ω/sq |
| (Heated zone with a diameter of 105 mm) | |
| Zone 3 | 74.3 Ω/sq |
| (Side surfaces) | |
| Zone 4 | 49.5 Ω/sq |
| (Top surface) | |

This laminated film is considerably superior to a mono-layered extruded film of the same thickness and with the same amount of the abovementioned conductivity carbon black filler in respect of the resistance values, the deep-drawing properties and the change in surface resistance associated therewith and also the shielding effect against electromagnetic radiation.

Example 3

An electrically conductive cast PC film, produced under the conditions described in Example 1 (bisphenol-A/bisphenol-Z copolycarbonate), with an amount of carbon black filler of 10% by weight of the carbon black used in Example 2 (based on the total solids content of carbon black/polycarbonate) and with an average thickness of 28 μm is coated with a polycarbonate melt (bisphenol-A granules from Example 1) as an insulating layer in a thickness of about 300 μm in the manner described under Example 1.

The resulting laminated polycarbonate film with a total thickness of about 330 μm has a surface resistance of 1,720Ω/sq on the electrically conductive side.

The cap produced by deep-drawing at about 240° C. with the shaped articles of Example 1 has the following surface resistances (measured in Ω/sq)

| Zone 1 (Starting laminate, thickness 330 μm) | 1,720 Ω/sq |
| Zone 2 (Heated zone with a diameter of 105 mm) | 2,330 Ω/sq |
| Zone 3 (Side surfaces) | 3,640 Ω/sq |
| Zone 4 (Top surface) | 1,694 Ω/sq |

Example 4

An electrically conductive cast PC film, produced according to Example 1, based on a pure bisphenol A polycarbonate with a molecular weight, determined by membrane osmometry, $\overline{M}_n$ of 49,000 and a relative solution viscosity of 2.19, with a graphite powder content of 40% by weight is 20 um thick and is coated, without after-drying and with a residual methylene chloride content of 1.5% (according to VDE 0345) in the manner described in Example 1. The thickness of the insulating layer, based on a bisphenol A polycarbonate as in Example 1, is about 320 μm. A very smooth laminated PC film with good adhesion of the conductive layer and a surface resistivity of 16,800Ω/sq is obtained.

Example 5

A very finely dispersed carbon black/PC methylene chloride dispersion based on a bisphenol A polycarbonate with a content of 0.5 mol% of bisphenol Z and a relative solution viscosity ηrel of 2.18 is cast, in accordance with the statements in Example 1, to an electrically conductive PC film with a carbon black content of 27% by weight of the conductivity carbon black as in Example 1 and an average thickness of about 60 μm (5a), the film exhibiting a weight loss (according to VDE 0345) of 3.0%. An approximately 35 μm thick electrically conductive PC film (5b) of the same composition and having a weight loss of 2.1% (VDE 0345) is likewise produced on a drum-casting machine.

5.1

On extrusion of bisphenol A polycarbonate granules with a barium sulphate content of 30% by weight (melt flow index of 27.2 g/10 minutes at 300° C. according to DIN 53 735), the 60 μm thick cast film (5a) filled with carbon black is inserted, without further drying, behind a sheet die at a melt temperature of about 260°–280° C., between a rubber roll with a temperature $T_1$ of about 80° C. and a metal roll with a structured surface and a temperature $T_2$ of about 120° C., together with the BaSO$_4$-filled PC melt, under an initial pressure of 80 bar and to a laminated PC film with a rough, scratch-resistant surface and an electrically conductive under-layer, for which a surface resistance, which is unchanged in comparison with the original cast film, of 158–160Ω/sq of the laminated PC film with a total thickness of about 300 μm is found, fabricated.

5.2

The 35 μm cast PC film (5b) is coated with an insulating layer (thickness 350 μm) of a bisphenol A polycarbonate (ηrel=1.34, melt flow index of 16 g/10 minutes at 300° C. according to DIN53 735) in the manner described in Example 1, and is subjected to thermoforming under the conditions described in Example 1 to give a cap with the dimensions of the deep-drawing mould of Example 1.

The following surface resistances are measured (FPP 5000 from VEECO):

| Zone 1 (Starting laminate, thickness about 380 μm) | 270 Ω/sq |
| Zone 2 (Heated zone with a diameter of 105 mm) | 347 Ω/sq |
| Zone 3 (Side surfaces) | 429 Ω/sq |
| Zone 4 (Top surface) | 257 Ω/sq |

5.3

The electrically conductive PC film (5b) is likewise pressed together with a polycarbonate melt, which consists of 60% by weight of the bisphenol A polycarbonate of Example 5.2 at 40% by weight of polybutylene terephthalate (melt flow index of the mixture of 38.5 g/10 minutes according to DIN 53 735), without a change in the given surface resistance of about 270Ω/sq, at a melt temperature of about 265° C. in the extrusion die and temperatures of $T_1$=70° C. for the first roll and $T_2$ (second roll) equals about 60° C. under an initial pressure of 55 bar, to give a modified polycarbonate laminate with a good resistance of the insulating layer to chemicals.

Example 6

The electrically conductive PC film, described as 5a in Example 5, with an average thickness of about 60 um and a carbon black content of 27% by weight is stretched in the longitudinal direction (casting direction) on a Hofmann and Schwabe stretching machine at a stretching temperature $T_S$ of 220° C., that is to say the temperature of the stretching roll heated to the highest temperature, and various ratios of intake ($V_1$) speed to delivery speed ($V_2$).

The following stretched electrically conductive PC films which, according to DIN 53 455, have elongations at break of 50–60% and tensile strengths of 75–100 N/mm$^2$, and residual solvent contents (methylene chloride) of 1.1 to 1.6% (VDE 0345), are obtained.

| Stretched PC film filled with carbon black (27% by weight) | Stretching ratio $V_1/V_2$ | Average thickness (μm) |
|---|---|---|
| 6a | 1:1.2 | about 50 |

| Stretched PC film filled with carbon black (27% by weight) | Stretching ratio $V_1/V_2$ | Average thickness ($\mu$m) |
|---|---|---|
| 6b | 1:1.7 | about 35 |

The strethed PC films filled with carbon black are coated, under the conditions described in Example 1, with a PC insulating layer using a polycarbonate melt as in Example 1, in a thickness of about 400-420 $\mu$m.

The resulting laminated PC films with a total thickness of about 450 $\mu$m are subjected to thermoforming using the shaped article described in Example 1 and in the manner described, protective caps with surfaces with the following surface resistances being obtained:

|  | Laminate 6a (about 450 $\mu$m thick) | Laminate 6b (about 440 $\mu$m thick) |
|---|---|---|
| Zone 1 (Starting laminate) | 198 $\Omega$/sq | 495 $\Omega$/sq |
| Zone 2 (Heated zone $\phi$ 105 mm) | 257 $\Omega$/sq | 502 $\Omega$/sq |
| Zone 3 (Side surfaces) | 278 $\Omega$/sq | 606 $\Omega$/sq |
| Zone 4 (Top surfaces) | 211 $\Omega$/sq | 334 $\Omega$/sq |

Deep-drawn articles (length 34.5 mm, width 32.4 mm, height 17 mm), surface resistances in $\Omega$/sq, measured with an FPP 5000 instrument from VEECO at 20°-25° C.

We claim:

1. A polycarbonate laminate consisting of
   (A) an aromatic, thermoplastic polycarbonate layer containing 5 to 45% by weight, based on the weight of polycarbonate layer (A), of carbon black or graphite and having an $\overline{M}w$ (weight-average molecular weight) of 20,000 to 300,000, a surface resistivity of 1 to $10^9 \Omega$ and a thickness of 0.002 to 0.4 mm, and
   (B) a layer, firmly lamiated to the above layer, of an aromatic, thermoplastic polycarbonate with an $\overline{M}w$ (weight-average molecular weight) of 10,000 to 60,000 and a thickness of 0.02 to 5 mm.

2. A polycarbonate laminate according to claim 1, containing 10 to 40% by weight of carbon black or graphite.

3. A polycarbonate laminate according to claim 1, containing 20 to 35% by weight of carbon black or graphite.

4. A polycarbonate laminate according to claim 1 in which the polycarbonate of layer (A) has an $\overline{M}w$ of 40,000 to 250,000.

5. A polycarbonate laminate according to claim 4 in which the polycarbonate of layer (A) has an $\overline{M}w$ of 60,000 to 200,000.

6. A polycarbonate laminate according to claim 1 in which the polycarbonate of layer (A) has a surface resistivity of 5 to $10^6 \Omega$.

7. A polycarbonate laminate according to claim 6 in which the polycarbonate of layer (A) has a surface resistivity of 10 to $10^3 \Omega$.

8. A polycarbonate laminate according to claim 1 in which the polycarbonate of layer (B) has an $\overline{M}w$ of 20,000 to 40,000.

9. A polycarbonate laminate according to claim 1 in which the polycarbonate of layer (B) has a thickness of 0.05 to 2 mm.

10. A polycarbonate laminate according to claim 1 in which the polycarbonate of layers (A) and (B) are those of bisphenol A containing 0 to 5 mole%, based on the number of moles of diphenols, of cocondensed bisphenol Z.

11. A polycarbonate laminate according to claim 1 having a thickness ratio of layer (B) to layer (A) of from 20:1 to 5:1 and in which the total thickness of the laminate is approximately 2 mm.

12. A polycarbonate laminate according to claim 11 having a thickness ratio of layer (B) to layer (A) of from 12:1 to 8:1 and in which the total thickness of the laminate is approximately 1 mm.

13. A polycarbonate laminate according to claim 1 in which layer (B) also contains up to 45% by weight, based on the total weight of layer (B), of one or more components selected from thermoplastic polyethylene terephthalates, thermoplastic polybutylene terephthalates and ABS plastics.

14. The laminate of claim 1 wherein said (A) is a layer made by casting.

15. A polycarbonate laminate consisting of (a) an aromatic, thermoplastic polycarbonate layer consisting of a polycarbonate resin having a weight average molecular weight of 20,000 to 300,000 and 5 to 45% by weight of carbon black, which layer is characterized in that its surface resistivity is from 1 to $10^9 \Omega$ and in that its thickness is from 0.002 to 0.4 mm, and (b) a layer, firmly laminated to said (a) comprising an aromatic thermoplastic polycarbonate resin having a weight average molecular weight of from 10,000 to 60,000 which layer is characterized in that its thickness is from 0.02 to 5 mm.

16. A process for the production of a polycarbonate laminate according to claim 1, in which extruded polycarbonate film which is produced by extrusion and contains 0 to 45% by weight, based on the total weight of layer (B), of one or more further components selected from thermoplastic polyethylene terephthalates, thermoplastic polybutylene terephthalates and ABS plastics, and is 0.02 to 5 mm thick, is pressed together with a cast polycarbonate film, which is optionally stretched and which contains 5 to 45% by weight, based on the weight of the cast polycarbonate film, of carbon black or graphite and has a thickness of 0.002 to 0.4 mm, between two rolls under pressures of 5 to 100 bar and at melt temperatures of the extruded film of 200° to 320° C.

17. A process according to claim 16 in which, of the two rolls, the pressure roll is coated with plastics or rubber.

18. A polycarbonate laminate produced by the process of claim 1.

* * * * *